Feb. 28, 1928.
C. PAYNE
1,661,008
MACHINE FOR AND PROCESS OF MOLDING BLOCKS
Filed June 25, 1926    7 Sheets-Sheet 2
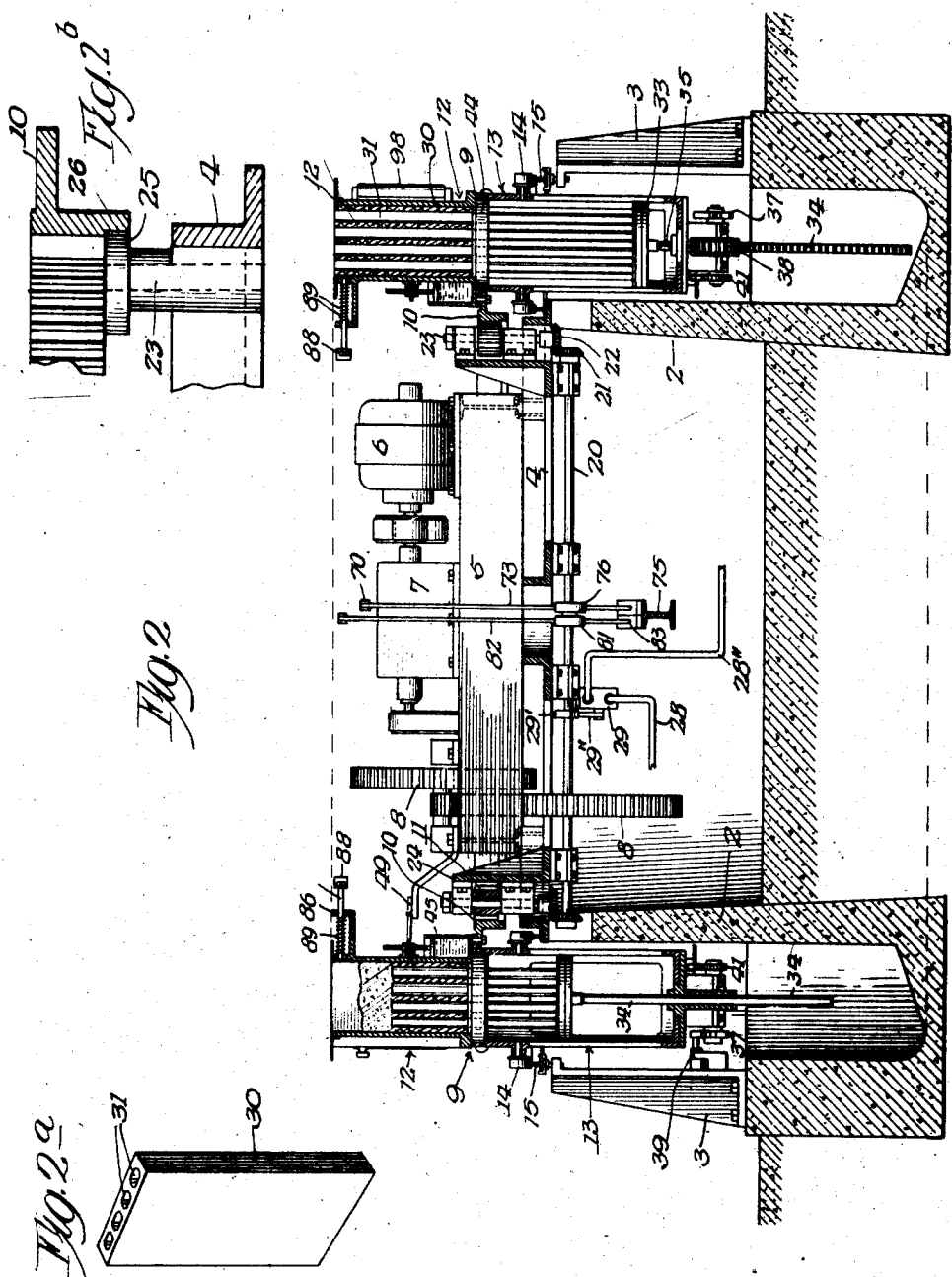
Inventor
Caleb Payne
By Wm. O. Belt
Atty.

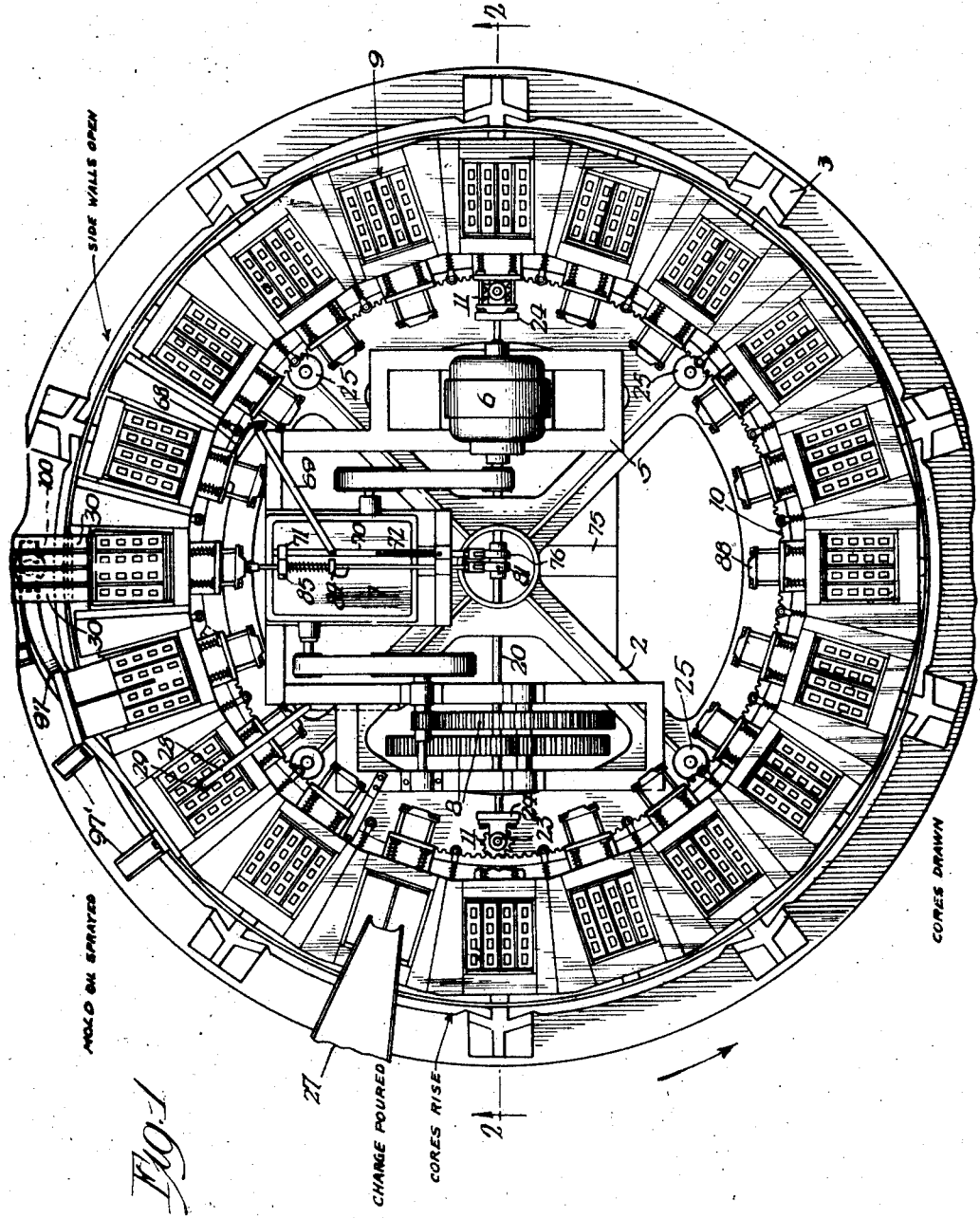

Feb. 28, 1928.
C. PAYNE
1,661,008
MACHINE FOR AND PROCESS OF MOLDING BLOCKS
Filed June 25, 1926　　　7 Sheets-Sheet 3
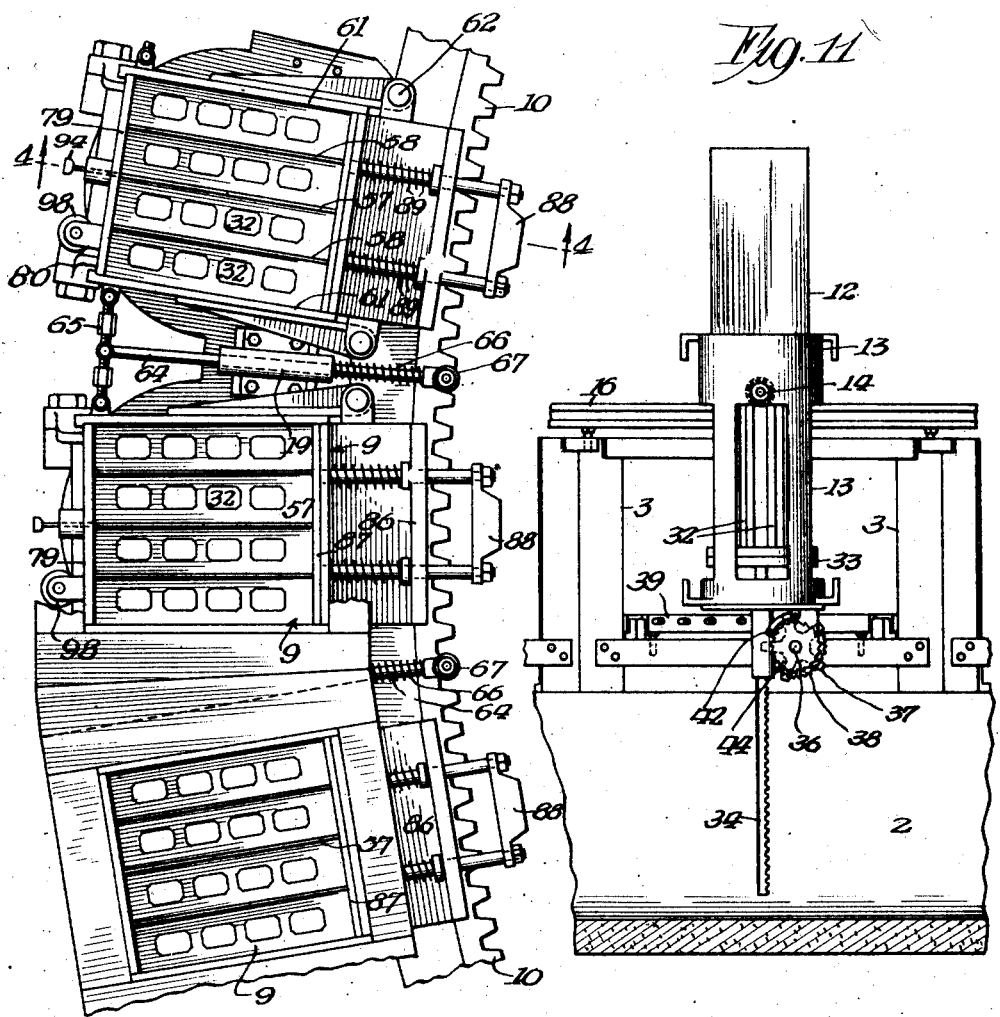
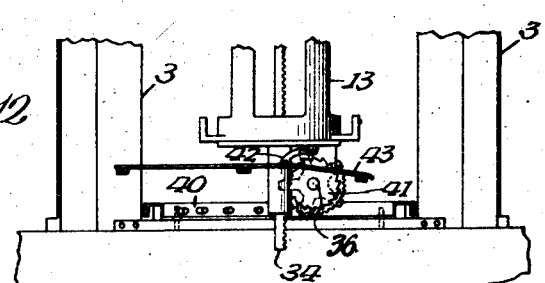

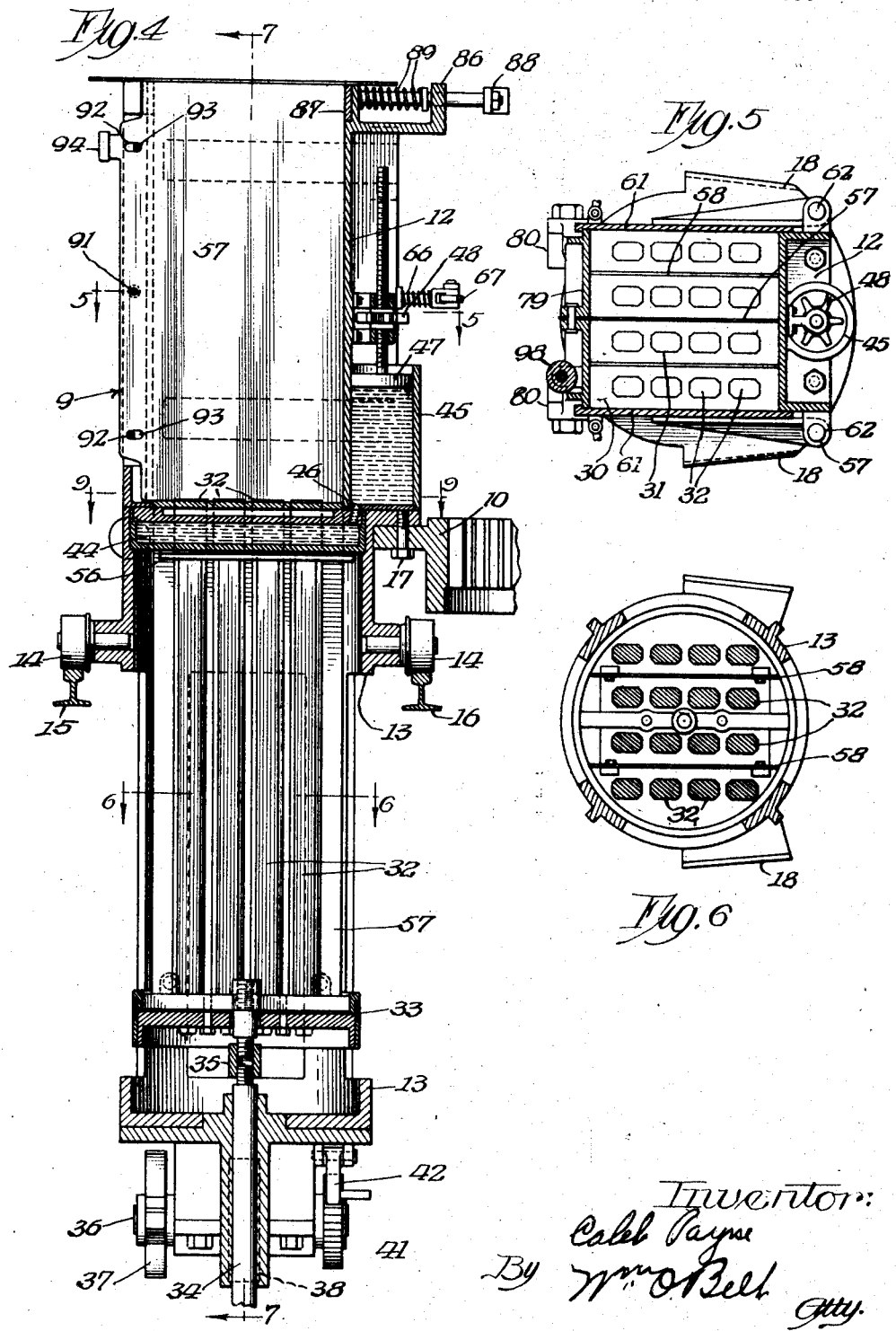

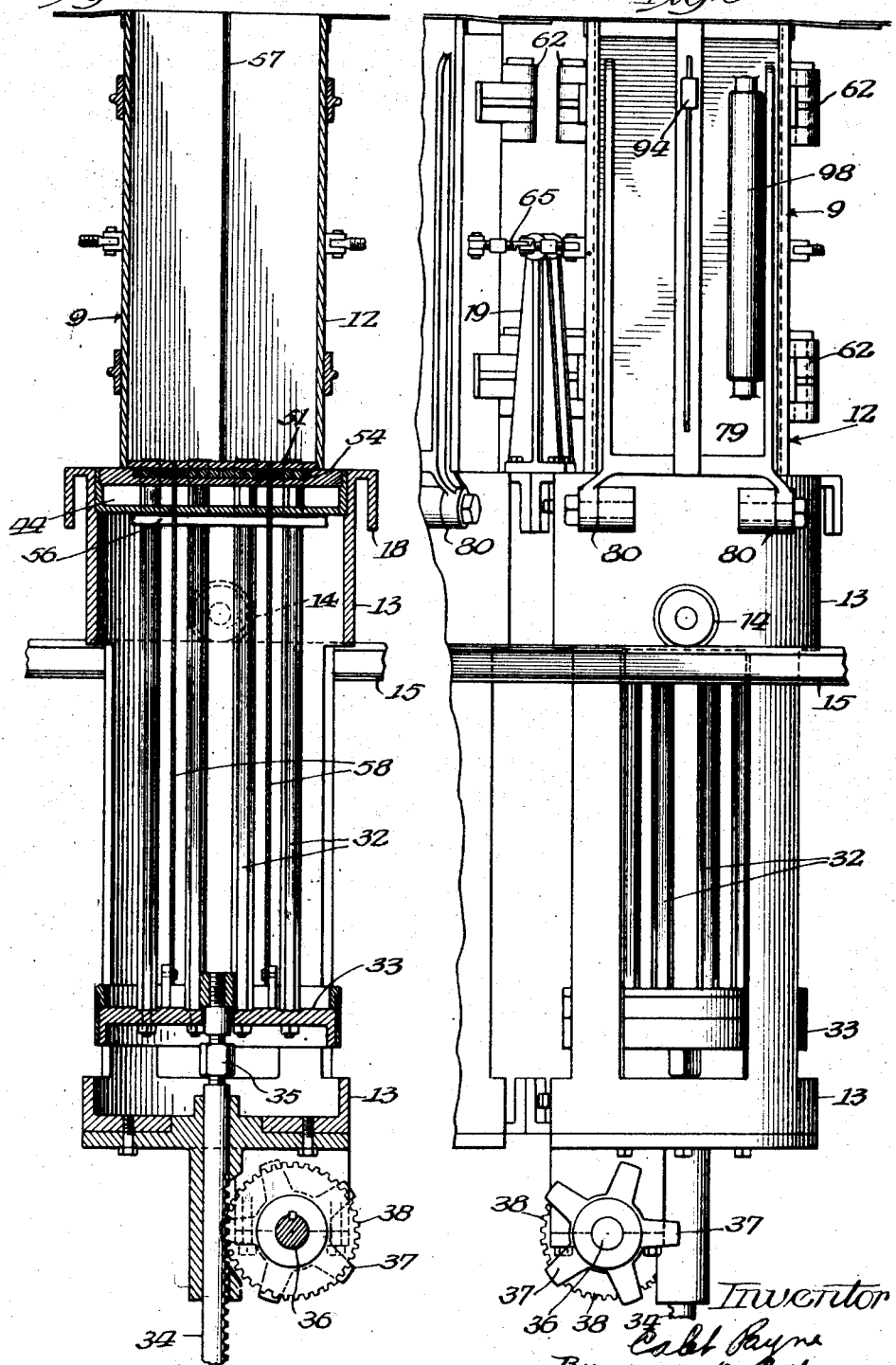

Feb. 28, 1928.
C. PAYNE
1,661,008
MACHINE FOR AND PROCESS OF MOLDING BLOCKS
Filed June 25, 1926        7 Sheets-Sheet 6
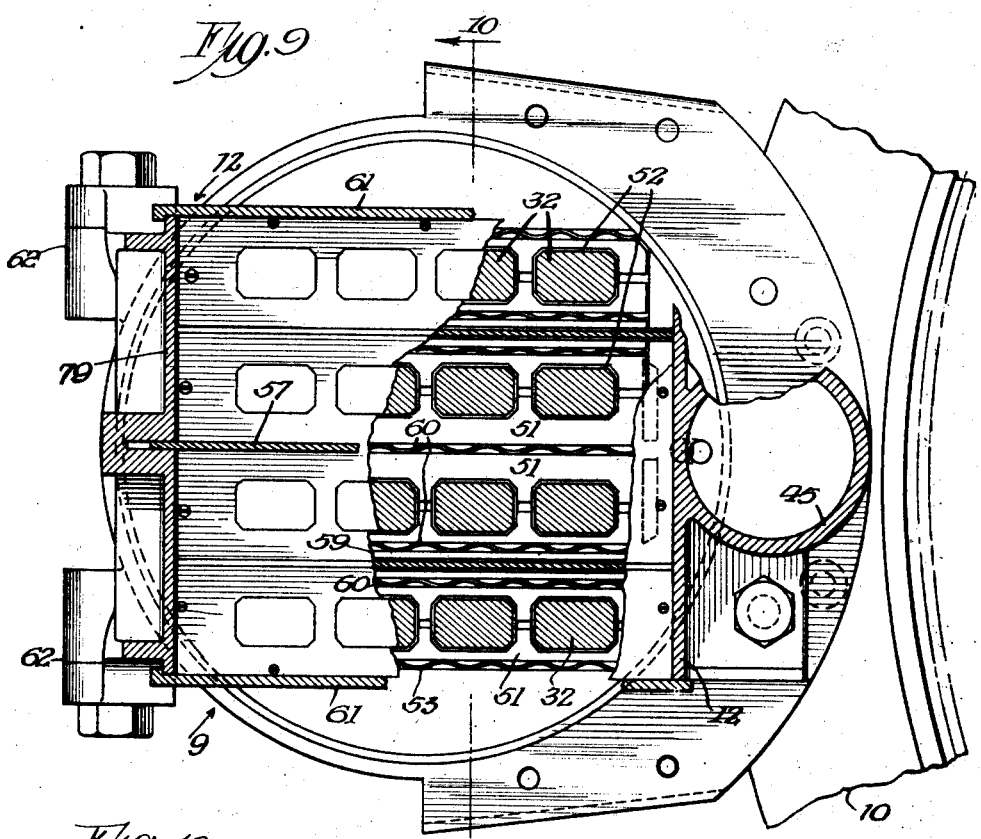
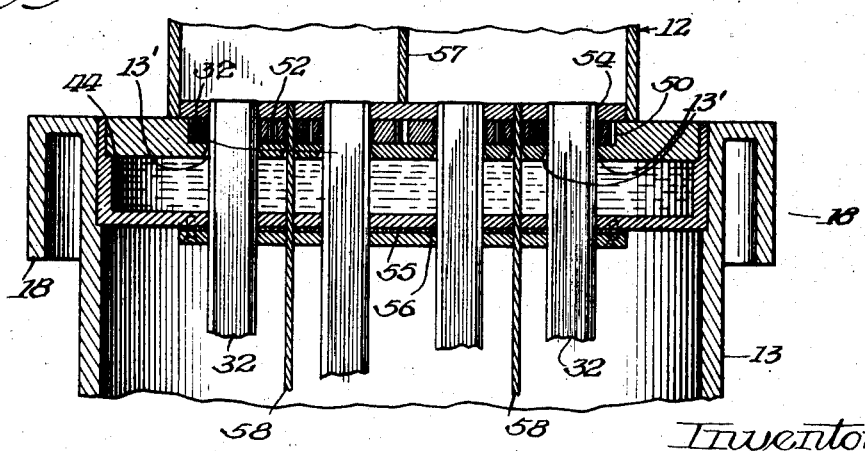

Feb. 28, 1928.
C. PAYNE
1,661,008
MACHINE FOR AND PROCESS OF MOLDING BLOCKS
Filed June 25, 1926 7 Sheets-Sheet 7
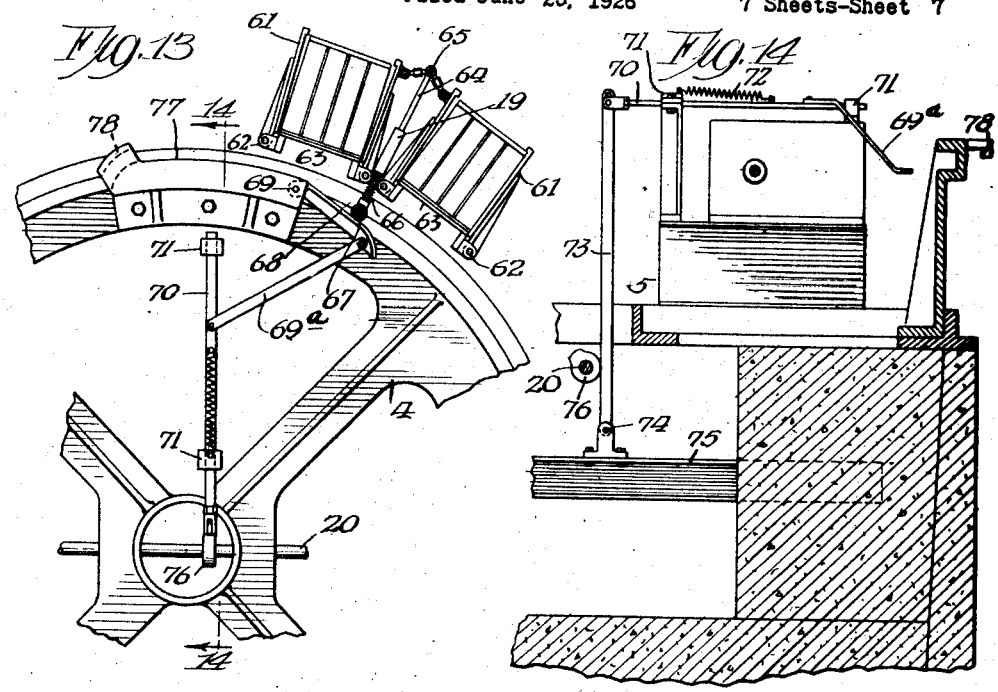
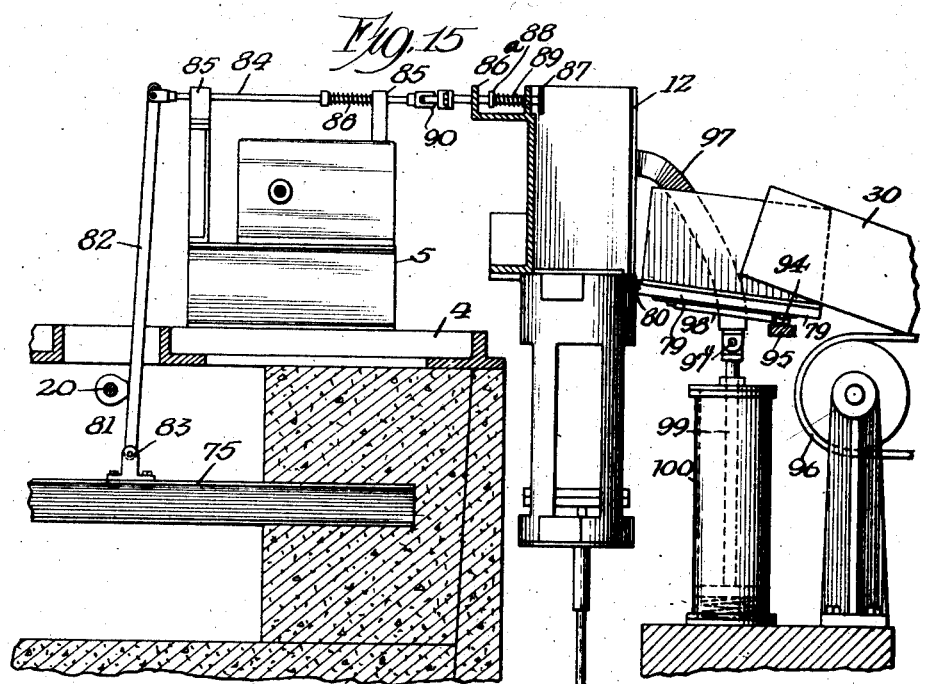

Patented Feb. 28, 1928.

1,661,008

UNITED STATES PATENT OFFICE.

CALEB PAYNE, OF CHICAGO, ILLINOIS, ASSIGNOR TO GYPSUM ENGINEERING & MANUFACTURING CO., OF CHICAGO, ILLINOIS, A CORPORATION OF ILLINOIS.

MACHINE FOR AND PROCESS OF MOLDING BLOCKS.

Application filed June 25, 1926. Serial No. 118,482.

This invention relates to the manufacture of building blocks from gypsum stucco or other similar material and its object is generally to provide an automatic machine of comparatively simple construction which will automatically operate in the performance of all the steps necessary for the production and discharge of a complete block of predetermined size and shape.

Another object of the invention is to keep the cores which form the openings in the blocks clean and free from accumulation of stucco material to facilitate the operation of the cores and to produce smooth troweled wall surfaces for the openings in the block and so that the blocks will be uniformly finished and free from irregularities and defects.

Another object of the invention is to provide a machine which will operate smoothly and quietly and at a comparatively high rate of speed, comprising various groups of mechanism coacting automatically to perform the several steps required for making and discharging the blocks.

Another object of the invention is to provide a self contained machine of rotary type comprising a plurality of molds and related parts all of which are automatically operated as the molds revolve to place them in condition to receive the stucco in a pourable condition, to introduce the cores into the stucco in the molds, to withdraw the cores from the blocks thus formed, and to discharge the blocks from the machine, the timing being such that when the blocks reach discharge position they are in condition to be handled without damage.

In the accompanying drawings I have illustrated a selected embodiment of the invention which has been used commercially and referring thereto:

Fig. 1 is a plan view of the machine.

Fig. 2 is a sectional view on the line 2—2 of Fig. 1.

Fig. 2ª is a perspective view of a block made by this machine.

Fig. 2ᵇ is a detail sectional view showing the guide roller construction.

Fig. 3 is an enlarged plan view showing three molds and associated parts.

Fig. 4 is a vertical section on the line 4—4 of Fig. 3 showing the cores in lowerd position.

Fig. 5 is a transverse section on the line 5—5 of Fig. 4.

Fig. 6 is a transverse section on the line 6—6 of Fig. 4.

Fig. 7 is a vertical section on the line 7—7 of Fig. 4.

Fig. 8 is a front elevation of one of the mold units as shown in the sectional views 4 and 7.

Fig. 9 is a transverse section on the line 9—9 of Fig. 4.

Fig. 10 is a vertical section on the line 10—10 of Fig. 9

Figs. 11 and 12 are detail diagrammatic views, partly in section, showing the means for raising and lowering the cores.

Fig. 13 is a detail fragmentary view showing the means for operating the sides of the molds.

Fig. 14 is a section on the line 14—14 of Fig. 13.

Fig. 15 is a detail sectional view showing the means for discharging the blocks from the machine.

Referring to the drawings the machine is mounted upon a foundation 1 of concrete or other suitable material having a circular support 2. A plurality of standards 3 are spaced from the support 2 and located at intervals about the support, being secured to the base of the foundation or forming part thereof, as may be desired. A stationary spider frame 4 is mounted on the support 2 of the foundation and it forms a support for the power mechanism which, in this embodiment, comprises a power frame 5 on which is mounted a motor 6, a variable speed device 7 and a reducing transmission 8 connected for operation. A plurality of mold units, designated generally 9 are connected by an interiorly located ring gear 10 and a plurality of driving pinions 11 are mounted on the spider frame to mesh with said ring gear and drive the same for revolving the mold units at a relatively low rate of speed.

Each mold unit comprises a mold frame 12 and a core frame 13, the mold frame being mounted on the core frame and secured thereto in any suitable manner and the ring gear 10 being secured to the top of the core frame. Rollers 14 are mounted on the core frame and travel on an outer track 15 supported on the standards 3 and on an inner track 16 supported on the spider frame.

The mold units are secured to the ring gear 10 by bolts 17 (Fig. 4). The core frames are provided with abutting flanges 18 to maintain them in proper relation to each other and guide brackets 19 are bolted to the flanges 18 and co-operate with the bolts 17 to hold the units together on the ring gear (Figs. 3-4).

A shaft 20 is supported in bearings from the under side of the spider frame 4 and is driven from the reducing transmission 8. At each end of this shaft there is a bevel gear 21 which meshes with a bevel gear 22 on a vertical shaft 23 which is supported in bearings on a bracket 24 mounted on the spider frame (Fig. 2), and the driving pinions 11 are mounted on these vertical shafts to mesh with the ring gear 10. Guide rollers 25 are mounted on the shafts 23 and engage a flange 26 on the ring gear 10.

The plurality of mold units 9 travel continuously in a circular orbit and the various operations necessary for making the blocks are performed while the molds are moving. The stucco or other mix is delivered through a chute 27 (Fig. 1) into a mold while the cores are in lowered position and immediately thereafter the cores are pushed up through the mix in the mold and remain there for a short period until the material has set sufficiently to enable the cores to be drawn without collapsing or otherwise damaging the blocks. Practical commercial use of the machine has demonstrated that the cores can be withdrawn after a mold has traveled through an arc of approximately 90°. After the cores are withdrawn the mold travels to a position approximately opposite the location where the cores were withdrawn and then the side walls of the mold are opened. Thereafter the block and the front of the mold are swung downwardly to substantially horizontal position and the block is delivered from the mold onto a conveyor belt by which it is carried away for drying. Then the mold is closed and the walls of the mold are sprayed with oil from a pipe 28 provided with a spraying device 28' of any suitable character. The pipe 28 is connected with a supply valve 29 (Fig. 2) which is in turn connected by a supply pipe 28" to a source of supply. A cam 29' on the shaft 20 engages an arm 29" to operate the control valve. Thus, the mold is sprayed after the block is ejected and the mold is closed and before a fresh charge of material is delivered into the mold.

Each mold unit is designed, in the embodiment illustrated to make four separate blocks 30, as indicated in Figs. 4-8, and each of these blocks has four core holes 31. The number, size and shape of the blocks and of the core holes may be varied as desired. The cores 32 are mounted on a cross head 33 to which a rack bar 34 is connected by adjusting means 35. A transverse shaft 36 is supported in bearings on the bottom of the core frames 13 and this shaft carries a star wheel 37 on one end and a gear 38, said gear meshing with the rack bar 34. At the location where the cores are thrust upward into the mold a pin rack 39 Figs. 2-11 is supported on the standards 3 in position to operate the star wheel 37 for thrusting the cores into the molds and through the material therein. Another pin rack 40 (Fig. 12) is mounted on the standards 3 in a position for operating the star wheel in a reverse direction to draw the cores down from the block and the mold. A ratchet 41 is also mounted on the shaft 36 and this ratchet is engaged by a back-stop pawl 42, which is pivotally mounted on the core frame. A cam track 43 is mounted on the circular support 2 and it is arranged in position to engage and release the backstop pawl so that the cores can be drawn down to lowered position by the pin bar 40 engaging the star wheel. The pawl and ratchet are provided to lock the cores in upward position while the mold is traveling from the position where the cores are elevated to the position where they are drawn down.

It is highly important to keep the cores clean and to prevent the material from accumulating thereon. Gypsum stucco mix is known to accumulate quickly upon a core if the opportunity is afforded, and, of course, this would greatly interfere with the proper operation of the machine and would necessitate stopping of the machine to clean the cores so that they could be drawn down from the block without damaging the block. I have found that it is not only desirable to lubricate the cores, but to maintain the lubricant under pressure and for this purpose I provide a lubricating chamber 44 (Figs. 4, 10) with which the supply chamber 45 communicates through a passage 46. A screw plunger 47 (Figs. 4, 10) is mounted on the back of the mold frame to force the lubricant through the passage 46 into the lubricating chamber 44 and maintain the lubricant under pressure in said chamber. A star wheel 48 is operated by a finger 49 which is conveniently mounted on any fixed part of the machine and is shown, in Fig. 2, fastened to the power frame 5 and at a position where the cores are being thrust up into the mold. Each mold unit is provided with independent lubricating means as just described, but a single finger is provided for operating each plunger. If more frequent adjustment of the plunger is found to be necessary, it may be accomplished by providing additional operating fingers.

A recess 50 (Figs. 9, 10) is provided in the top of the core frame 13 and scraper bars 51 shaped to fit the cores are seated in this recess on opposite sides of the cores and are provided with a facing 52 of felt or other suitable material to engage the cores. These scraper bars are located in the recess 50 of the top of the core frame and are held by the bottom of the mold frame and they are under sufficient pressure at all times to insure proper contact with the cores for cleaning the cores. The openings 54 in the bottom of the mold frame are of just sufficient size and of the proper shape to permit the cores to pass therethrough. A felt packing 55 is secured underneath the bottom of the lubricating chamber 44 by a plate 56 to prevent the lubricant from passing down through the core molds 32 in the bottom of said chamber.

In an embodiment such as I have shown in the drawings for making four blocks in each mold I provide a fixed partition 57 (Figs. 7, 9, 10) which is preferably located in a central position in the mold, and also two movable partitions 58 which are mounted on the head 33 and travel with the cores through the lubricating chamber into and out of the mold. Scraper bars 59 are also arranged in the recess 50 for these movable partitions, and springs 60 yieldingly hold the scraper bars with the partitions.

The sides 61 of the mold frame are hinged at 62 to the back 63 of the mold frame (Fig. 5) and the mechanism for opening the sides is shown in Figs. 3, 13 and 14. This mechanism comprises a plunger 64 mounted to slide in the bracket 19. The outer end of the plunger is engaged with a toggle 65 which is connected with the sides of adjacent molds. A spring 66 normally urges the plunger inward to hold the sides in closed position. A roller 67 is provided on the inner end of the plunger to ride upon a lever arm 68 which is pivoted at 69 on the spider frame 4. The free end of the lever is connected by a link 69ª with a sliding rod 70 mounted in bearings 71 on the power frame 5. A spring 72 normally holds the rod is retracted position. The rear end of the rod 70 is connected to an upright lever 73 which is pivoted at 74 on a beam 75 supported on the foundation. A cam 76 on the shaft 20 engages the lever 73 to swing the arm 68 outward when the plunger 64 is registered therewith, the object being to thrust the plunger outward and break the toggle to open the sides with a quick motion. The roller 67 travels from the pivoted lever arm 68 into the track 77 while the blocks are being ejected from the molds and after this is completed the roller engages a cam 78 at the end of the track 77 which pulls the plunger 64 rearward and straightens the toggle to close the sides of the mold.

After the sides of the molds have been opened an ejector mechanism is operated to swing the front of the mold and the blocks therewith into discharged position (Fig. 15). The front 79 of the mold is hinged to the mold frame at 80 and it is adapted to be lowered to a position somewhat below the horizontal to discharge the blocks 30. A cam 81 on the shaft 20 is arranged to operate a lever 82 which is pivoted at 83 on the beam 75. The upper end of the lever 82 is engaged with the rear end of an ejector rod 84 which is mounted in bearings 85 on the power frame 5. A spring 86 on the ejector rod 84 normally urges the rod in rearward position. On each mold frame there is a bracket arm 86ª and an ejector 87 is arranged within the mold frame and forms a part of the back wall of the mold frame 12. This ejector is carried by a slide 88 which is normally held by a spring 89 in retracted position to be engaged by a roller 90 on the forward end of the ejector rod 84. The ejector 87 extends across the mold to engage each of the blocks therein and, of course, each mold is provided with an ejector independent of every other mold, but all of the ejectors are operated by the one ejector rod 84. The cores and the movable partitions have been withdrawn from the mold before the ejector operates, but the fixed partition 57 always remains in the mold and is fastened by a pin 91 (Fig 4) at or about the middle of the partition at the forward edge thereof, and also by pins 92 engaging slots 93 in the partition adjacent the top and bottom at the front edge thereof. A projection 94 is provided on the front edge of the partition 57 adjacent the top thereof so that when the front of the mold with the blocks thereon is carried to discharging position the projection 94 will strike a fixed stop 95 (Fig. 15) located at some convenient point adjacent the machine to swing the partition slightly on its pivot 91, within the limits provided by the pins 92 and slots 93, to release the partition from the adjacent blocks. The ejector may be operated so that the blocks will be discharged from the front of the mold when the latter swings to lowered position, or it may be desirable to provide a workman to guide the blocks from the mold front onto a conveyor 96 (Fig. 15). Immediately after the blocks are discharged, the rotary movement of the machine being continuous and this discharging operation being performed during this continuous rotary movement, the open front 79 of the mold travels up a cam track 97 (Fig. 15) to closed position. A roller 98 (Fig. 8) is mounted on the front of the mold to engage the cam 97 to facilitate the closing movement of the mold front. The cam 97 is mounted on brackets 97' (Fig. 1) which are supported on the foundation 1 and the lower end of the cam is pivotally engaged at 97" with the plunger 99 of a dash pot 100 (Fig. 15) to relieve the shock of the swinging mold front.

My invention provides a comparatively simple machine which operates automatically and in a cycle of movement receives the mix, inserts the cores therein, withdraws the cores, and ejects the completed blocks from the molds. These blocks are in a condition to be handled when they are delivered from the machine and they are then conveyed to driers and made ready for the market. The molds may be made for molding one or more blocks, as may be desired, but the machine is designed for molding at least four blocks of a standard or other size in each mold. It is an important feature of my invention that the cores are thoroughly lubricated before they enter the molds. Gypsum stucco particularly has the quality of building up very quickly on a core unless suitable provision is made for preventing it and it is necessary to keep the cores clean in order that the machine may operate continuously. Therefore, I arrange for the cores to travel downward from the mold through the openings 54 in the bottom of the mold and between the yielding felt faced scraper bars 51. The walls of the openings 54 will scrap off the major portion of any material that may be adhering to the cores and the felt faced scrapers will clean the cores so that they will pass through the lubricant chamber practically clean. The movable partitions will be cleaned and lubricated in like manner as the cores. When the cores travel up into the mold they are freshly lubricated so that it will be noted that the cores are cleaned and lubricated on their downward movement and are again lubricated on their upward movement, thus insuring that the cores will at all times be clean and well lubricated. The lubricant on the cores prevents the material from adhering thereto and any material that may adhere is removed before the cores pass through the lubricant chamber on their downward movement. The cores do not pull any of the material into the lubricant chamber as they pass downward therethrough, and the lubricant is always kept free from the material. I have found that a heavy lubricant like grease is more desirable than a liquid lubricant, but I do not wish to restrict myself to a particular grade. It is also important that the lubricant should be kept under pressure to assist in prevent the material from entering the chamber and to keep the cores clean. I prefer to chamfer the wall of the openings in the top of the core frame 13 at 13' to receive the lubricant so that it will co-operate with the packing and other parts to prevent any of the material entering the lubricating chamber with the cores.

Blocks made of gypsum stucco or other such material are being used in greater quantities every day for building purposes and to extend their usefulness and to make them more desirable for all purposes it is highly important that the blocks should be uniform in a given size and shape. When they are uniform they can be set up in a wall or partition and plaster applied directly thereto with an economical use of plaster. It is also important that the blocks should be free from imperfections, and that the edges should be sharp and continuous in order to make tight joints proper registered to provide a smooth wall surface. My machine produces blocks of this kind and while the operation of the machine is relatively slow for satisfactory work, the production capacity of the machine is high and with the cost of production is economical. In the practical operation of the machine the cores are withdrawn before the material of the block has completely set and while it is still in a relatively soft condition. This is possible because the walls of the mold separate the block in its upright position and also because the cores travel smooth and trowel the walls of the openings in the block when they are drawn down through the block and out of the mold. This has the effect of pulling the free water into the core holes in the blocks and stabilizing the blocks so that they will not collapse after the cores are withdrawn. I am able to use a denser stucco mix with my machine than has been customary with molding machines heretofore.

I am aware that changes in the form, construction and arrangement of the parts of my machine may be made without departing from the invention or sacrificing the advantages thereof and I reserve the right to make all such changes as fairly fall within the scope of the following claims:

I claim:

1. The combination of a mold, a lubricant chamber, means for applying pressure upon the lubricant is said chamber, a core, and means for moving the core through the lubricant chamber into and out of the mold.

2. The combination of a mold, a lubricant chamber, automatically operated means for applying pressure upon the lubricant, a core, and means for moving the core through the lubricant chamber into and out of the mold.

3. The combination of a mold, a lubricant chamber, a supply chamber for the lubricant, means operating in said supply chamber for applying pressure upon the lubricant, a core, and means for moving the core through the lubricant chamber into and out of the mold.

4. The combination of a mold, a lubricant chamber, a supply chamber for the lubricant, means operating in said supply chamber for applying pressure upon the lubricant, a core, means for moving the core through the lubricant chamber into and out of the mold, and means for automatically operating the pressure means in the supply chamber.

5. The combination of a mold, a lubricant chamber for the mold, a supply chamber for the lubricant, screw means operating in said supply chamber for applying pressure upon the lubricant, a core, means for moving the core through the lubricant chamber into and out of the mold, and means for automatically operating said screw means intermittently for maintaining pressure upon the lubricant.

6. The combination of a mold, means for moving the mold in a definite path, a lubricant chamber mounted on the mold, means for applying pressure upon the lubricant in the chamber, a core, means for moving the core through the lubricant chamber into and out of the mold, and means for operating said pressure means automatically at a predetermined position in the path of travel of the mold for maintaining pressure upon the lubricant.

7. The combination of a mold, means for moving the mold in a definite path, a lubricant chamber mounted on the mold, screw means for applying pressure upon the lubricant in the chamber, a core, means for moving the core through the lubricant chamber into and out of the mold, and fixed means for engaging and operating said screw means at a predetermined position in the path of travel of the mold for maintaining pressure upon the lubricant.

8. The combination of a mold, means for moving the mold in a definite path, a lubricant chamber mounted on the mold, a supply chamber for the lubricant, a screw plunger operating in said supply chamber for applying pressure upon the lubricant in the lubricant chamber, a core, means for moving the core through the lubricant chamber into and out of the mold, a star wheel for operating said screw plunger, and means for automatically operating said star wheel at a predetermined position in the path of travel of the mold for maintaining pressure upon the lubricant.

9. The combination of a mold, means for moving said mold bodily in a circular orbit, a lubricant chamber at the bottom of the mold, a supply chamber for the lubricant mounted on the back of the mold, screw means operating in said supply chamber for applying pressure upon the lubricant in the lubricant chamber, and fixed means for engaging and operating said screw means at a predetermined position in the path of travel of the mold for maintaining pressure upon the lubricant.

10. The combination of a mold, a lubricant chamber, a core, means for moving the core through the lubricant chamber into and out of the mold, and resiliently operated means under pressure within the lubricant chamber and engaging the core.

11. The combination of a mold, a lubricant chamber, a core, means for moving the core through the lubricant chamber into and out of the mold, and resiliently operated scrapers under pressure within the lubricant chamber engaging the core on opposite sides thereof.

12. The combination of a mold, a lubricant chamber, a core, means for moving the core through the lubricant chamber into and out of the mold, oppositely disposed scrapers shaped to embrace the core within the lubricant chamber, and means for resiliently urging the scrapers into engagement with the core.

13. The combination of a mold, a lubricant chamber, a core, means for moving the core through the lubricant chamber into and out of the mold, oppositely disposed felt-faced scrapers shaped to embrace the core within the lubricant chamber, and reversely bent flat springs at the back of the scrapers for holding them in operative engagement with the core.

14. The combination of a mold, a lubricant chamber, a plurality of cores arranged in parallel series, partitions parallel with the series of cores, means for moving the cores and partitions bodily through the lubricant chamber into and out of the mold, and resiliently operated scrapers under pressure within the lubricant chamber and engaging opposite sides of the cores and partitions.

15. The combination of a mold, a lubricant chamber, a plurality of spaced cores arranged in alinement, means for moving the cores through the lubricant chamber into and out of the mold, and scrapers under pressure within the lubricant chamber engaging opposite sides of the cores and projecting between the cores.

16. The combination of a mold, a lubricant chamber, a plurality of spaced cores arranged in alinement, means for moving the cores through the lubricant chamber into and out of the mold, scrapers within the lubricant chamber engaging opposite sides of the cores and projecting between the cores, and resilient means operating on the scrapers to hold them in operative engagement with the cores.

17. The combination of a mold, a partition pivotally mounted therein near its mid-height, and means for limiting the pivotal movement of said partition, said partition being at all times retained within the mold.

18. The combination of a mold having a hinged front wall, and a partition within the mold pivoted near its mid-height to said front wall, said partition being at all times retained within the mold.

19. The combination of a mold having a hinged front wall, and a partition within the mold pivoted between its top and bottom and at its front edge to said front wall, said partition being at all times retained within the mold.

20. The combination of a mold having a hinged front wall, a partition within the mold pivoted between its top and bottom and at its front edge to said front wall, and means on the front wall for limiting the pivotal movement of said partition, the latter being at all times retained within the mold.

21. The combination of a mold, a plurality of spaced cores arranged in four parallel series below the mold, a partition arranged between each outer pair of series of cores, means for moving the cores and their partitions through the lubricant chamber into and out of the mold, and a partition positioned within the mold to separate the outer pairs of series of cores, said last-named partition being at all times retained within the mold.

22. In a machine of the class described, the combination of a support, a frame on the support, an upright ring gear, means on the frame for revolving said gear, a plurality of mold units mounted on the ring gear, tracks on said support, and means located on said mold units approximately midway between the top and bottom thereof in proximity to said ring gear and traveling on said tracks.

23. In a machine of the class described, the combination of a support, a frame on the support, an upright ring gear, vertical shafts on the frame, gears on said shafts meshing with the ring gear, means for driving said shafts, a plurality of mold units mounted on the ring gear and extended above and below the same, tracks on said support, and means located on said mold units adjacent said ring gear and traveling on said tracks.

24. In a machine of the class described, the combination of a support, a frame on the support, an upright ring gear having a depending flange, a plurality of mold units mounted on the ring gear, means mounted on vertical shafts and laterally for driving the ring gear, and guide means engaging said flange.

25. In a machine of the class described, the combination of a support, a frame on the support, an upright ring gear having a depending flange, a plurality of mold units mounted on the ring gear, vertical shafts on the frame, gears on the shafts meshing with said ring gear, and guide rollers mounted on the frame on said gear shafts between said gears and laterally engaging said flange.

26. In a machine of the class described, the combination of a support, a frame on the support, a ring gear, a plurality of molds mounted on the ring gear, said molds having hinged sides, a toggle between each pair of molds and connected to said sides, means on the frame for revolving said ring gear and molds, a tripper on the frame, and means movably mounted for imparting a sharp movement to the tripper to break the toggle and open the sides of each mold at a predetermined position in the orbit of travel of the molds.

27. In a machine of the class described, the combination of a support, a frame on the support, a ring gear, a plurality of molds mounted on the ring gear, said molds having hinged sides, a toggle between each pair of molds and connected to said sides, means on the frame for revolving said ring gear and molds, a tripper on the frame to break the toggle, and movably mounted cam means on the frame to operate the tripper for opening the sides of each mold at a predetermined position in the orbit of travel of the molds.

28. In a machine of the class described, the combination of a support, a frame on the support, a ring gear, a plurality of molds mounted on the ring gear, said molds having hinged sides, a toggle between each pair of molds and connected to said sides, means on the frame for revolving said ring gear and molds, movably mounted means for breaking the toggle to open the sides of each mold at a predetermined position in the orbit of travel of the molds, and means for straightening the toggle to close said sides.

29. In a machine of the class described, the combination of a support, a frame on the support, a ring gear, a plurality of molds mounted on the ring gear, said molds having hinged sides, a toggle between each pair of molds and connected to said sides, means on the frame for revolving said ring gear and molds, movably mounted means for breaking the toggle to open the sides of each mold at a predetermined position in the orbit of travel of the molds, and a cam on the frame for straightening the toggle to close said sides.

30. In a machine of the class described, the combination of a support, a frame on the support, a plurality of molds having hinged sides, means for revolving the molds in a circular orbit of travel about the frame, a toggle between each pair of molds and connected to the sides thereof, a rod for operating each toggle, movably mounted means for moving the rod in one direction to break the toggle, and means for moving the rod in the opposite direction to straighten the toggle.

31. In a machine of the class described, the combination of a support, a frame on the support, a plurality of molds having hinged sides, means for revolving the molds in a circular orbit of travel about the frame, a toggle between each pair of molds and connected to the sides thereof, a rod for operating each toggle, a tripper for moving the rod in one direction to break the toggle and open the mold sides, and a movably mounted cam for engaging and moving the rod in the opposite direction to straighten the toggle.

32. In a machine of the class described, the combination of a frame, a plurality of molds adapted to travel in a circular orbit, the front of each mold being movable, a movable section in the back of each mold, and means for moving said section to eject the blocks from the mold, at the front thereof.

33. In a machine of the class described, the combination of a frame, a plurality of molds adapted to travel in a circular orbit, the front of each mold being movable, a movable section in the back of each mold, a spring pressed pusher for operating said section to eject the block from the mold, and means for operating said pusher at a predetermined position in the orbit of travel of the mold.

34. In a machine of the class described, the combination of a frame, a plurality of molds adapted to travel in a circular orbit, the front of each mold being hinged at the bottom, means for swinging the mold front to discharge the block, and a cam for returning the mold front to closed position.

35. In a machine of the class described, the combination of a frame, a plurality of molds adapted to travel in a circular orbit, the front of each mold being hinged at the bottom, means for swinging the mold front to discharge the block, a cam for returning the mold front to closed position, and a roller on the mold front to engage the cam.

36. In a machine of the class described, the combination of a frame, a plurality of molds adapted to travel in a circular orbit, the front of each mold being hinged at the bottom, a movable section in the back of each mold adjacent the top thereof, means for moving said section to eject the block from the mold by tilting the block forwardly and swinging the front of the mold downwardly, and a cam for returning the front of the mold to closed position.

37. In a machine of the class described, the combination of a frame, a plurality of mold units adapted to travel in a circular orbit, a core for each mold, and means for moving the core with the mold comprising a rack and pinion, means for operating the pinion, and a pawl and ratchet to hold the core in position as it is moved.

38. In a machine of the class described, the combination of a frame, a plurality of mold units adapted to travel in a circular orbit, a core for each mold, and means for moving the core with the mold comprising a rack and pinion, means for operating the pinion, a pawl and ratchet to hold the core in position as it is moved, and means for releasing the pawl.

39. In a machine of the class described, the combination of a frame, a plurality of mold units adapted to travel in a circular orbit, a core for each mold, means for moving the core into the mold, means for holding the core in position as it is moved, means for releasing said holding means, and means for withdrawing the core from the mold.

40. In a machine of the class described, the combination of a frame, a plurality of mold units adapted to travel in a circular orbit, a core for each mold, and means for moving the core with the mold comprising a rack and pinion, means for operating the pinion, a pawl and ratchet to hold the core in position as it is moved, means for releasing the pawl, and means for withdrawing the core from the mold comprising a pin rack to engage the star wheel.

41. The herein-described process of making cored blocks which includes inserting a core into the block material and withdrawing it therefrom through a lubricating medium maintained under pressure.

42. The herein-described process of making cored blocks which includes inserting a core into the block material and withdrawing it therefrom through a heavy lubricant, such as grease, maintained under pressure.

CALEB PAYNE.